United States Patent
Park et al.

(10) Patent No.: US 8,897,617 B2
(45) Date of Patent: Nov. 25, 2014

(54) DIGITAL IMAGE CAPTURING APPARATUS AND METHOD OF CONTROLLING THE SAME

(75) Inventors: Wan-je Park, Seongnam-si (KR); Sang-jin Park, Seoul (KR); Jung-ah Seung, Guri-si (KR); Ju-yeon You, Seongnam-si (KR); Hye-jin Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 116 days.

(21) Appl. No.: 13/295,467

(22) Filed: Nov. 14, 2011

(65) Prior Publication Data

US 2012/0177338 A1    Jul. 12, 2012

(30) Foreign Application Priority Data

Jan. 11, 2011 (KR) .......... 10-2011-0002884

(51) Int. Cl.

| | |
|---|---|
| *H04N 9/80* | (2006.01) |
| *H04N 21/433* | (2011.01) |
| *H04N 21/432* | (2011.01) |
| *H04N 9/82* | (2006.01) |
| *H04N 5/45* | (2011.01) |
| *H04N 21/81* | (2011.01) |
| *H04N 21/845* | (2011.01) |
| *H04N 5/93* | (2006.01) |
| *H04N 21/4223* | (2011.01) |
| *H04N 5/445* | (2011.01) |

(52) U.S. Cl.
CPC ....... *H04N 21/4223* (2013.01); *H04N 21/4334* (2013.01); *H04N 2005/44517* (2013.01); *H04N 21/4325* (2013.01); *H04N 9/8227* (2013.01); *H04N 5/45* (2013.01); *H04N 21/8153* (2013.01); *H04N 21/8455* (2013.01); *H04N 5/9305* (2013.01)
USPC ........................................................ 386/241

(58) Field of Classification Search
CPC ..... H04N 5/00; H04N 5/265; H04N 5/44591; H04N 21/00; H04N 21/8153; H04N 5/45; H04N 5/9305; H04N 9/8227
USPC ......................................... 386/200, 224, 241
See application file for complete search history.

(56) References Cited

U.S. PATENT DOCUMENTS 4,725,888 A * 2/1988 Hakamada .................. 348/565
4,777,531 A * 10/1988 Hakamada et al. ......... 348/565

(Continued)

FOREIGN PATENT DOCUMENTS

| KR | 1020060117389 A | 11/2006 |
|---|---|---|
| KR | 1020070022469 A | 2/2007 |
| KR | 1020090075258 A | 7/2009 |

*Primary Examiner* — Huy T Nguyen
(74) *Attorney, Agent, or Firm* — Drinker Biddle & Reath LLP

(57) ABSTRACT

A digital image capturing apparatus for displaying on a first display image that indicates a progress of video recording or reproduction, a second display image corresponding to a captured still image, and a method of controlling the same. A time point when a still image is captured may be indicated and thus a user may easily check a video recording or reproduction history.

20 Claims, 10 Drawing Sheets

(56) References Cited

U.S. PATENT DOCUMENTS

| | | | |
|---|---|---|---|
| 5,157,511 A * | 10/1992 | Kawai et al. | 386/243 |
| 5,835,663 A * | 11/1998 | Momochi | 386/280 |
| 7,280,711 B2 * | 10/2007 | Yoshida et al. | 382/305 |
| 8,565,831 B2 * | 10/2013 | Chang et al. | 455/566 |
| 2008/0174681 A1 * | 7/2008 | Okada et al. | 348/231.99 |
| 2010/0115410 A1 * | 5/2010 | Fu et al. | 715/721 |
| 2010/0128139 A1 * | 5/2010 | Kim et al. | 348/222.1 |
| 2011/0249861 A1 * | 10/2011 | Tokutake | 382/103 |

* cited by examiner

VIDEO RECORDING

VIDEO RECORDING

S1 RECORDING

DIGITAL IMAGE CAPTURING APPARATUS AND METHOD OF CONTROLLING THE SAME

CROSS-REFERENCE TO RELATED PATENT APPLICATION

This application claims the priority benefit of Korean Patent Application No. 10-2011-0002884, filed on Jan. 11, 2011, in the Korean Intellectual Property Office, the disclosure of which is incorporated herein in its entirety by reference.

BACKGROUND

1. Field of the Invention

Embodiments relate to a digital image capturing apparatus and a method of controlling the same.

2. Description of the Related Art

A digital camera has a function of capturing an image according to a user manipulation signal during video recording or reproduction. A user captures and stores still images when certain events occur. However, the captured still images are simply stored or sequentially displayed, and time points when the still images are captured during the video recording or reproduction are not indicated.

SUMMARY

According to an embodiment, a digital image capturing apparatus and a method of controlling the same indicates a time point when a still image is captured during video recording or reproduction to allow a user to easily check a video recording or reproduction history.

According to an embodiment, a method of controlling a digital image capturing apparatus includes starting video recording or reproduction; generating a first display image that indicates a progress of the video recording or reproduction; generating a still image by selecting at least one of a plurality of frame images for forming a video; generating a second display image corresponding to the still image; and displaying the second display image on the first display image in correspondence with a time point when the still image is generated.

The generating of the still image may include generating the still image by using at least one of the plurality of frame images, which is selected by a user.

The generating of the still image may include generating a plurality of still images by selecting some of the plurality of frame images, and the displaying of the second display image on the first display image may include displaying on the first display image second display images corresponding to the still images in correspondence with time points when the still images are generated.

The displaying of the second display images on the first display image may include displaying on the first display image the second display images corresponding to the still images at intervals proportional to differences between the time points when the still images are generated.

The method may further include comparing the number of still images to a reference number; comparing a difference between a time point when a first still image is generated and a time point when a second still image previous to the first still image is generated, to a reference difference if the number of still images is greater than the reference number; not displaying on the first display image a second display image corresponding to the second still image if the difference between the time points is equal to or less than the reference difference; and displaying on the first display image the second display image corresponding to the second still image if the difference between the time points is greater than the reference difference.

The displaying of the second display image on the first display image may include displaying the second display image on the first display image during the video recording or reproduction.

The generating the second display image may include generating the second display image by gradually reducing the still image.

The displaying of the second display image on the first display image may include displaying a plurality of overlapping second display images.

The plurality of overlapping second display images may be continuously photographed.

According to another embodiment, a digital image capturing apparatus includes a first display image generation unit that generates a first display image that indicates a progress of video recording or reproduction; a still image generation unit that generating a still image by selecting at least one of a plurality of frame images for forming a video; a second display image generation unit that generates a second display image corresponding to the still image; and a display control unit that displays the second display image on the first display image in correspondence with a time point when the still image is generated.

The still image generation unit may generate the still image by using at least one of the plurality of frame images, which is selected by a user.

The still image generation unit may generate a plurality of still images by selecting some of the plurality of frame images, and the display control unit may display on the first display image second display images corresponding to the still images in correspondence with time points when the still images are generated.

The display control unit may display on the first display image the second display images corresponding to the still images at intervals proportional to differences between the time points when the still images are generated.

The digital image capturing apparatus may further include a first determination unit that compares the number of still images to a reference number; and a second determination unit that compares a difference between a time point when a first still image is generated and a time point when a second still image previous to the first still image is generated, to a reference difference if the number of still images is greater than the reference number, and the display control unit may not display on the first display image a second display image corresponding to the second still image if the difference between the time points is less than the reference difference, and may display on the first display image the second display image corresponding to the second still image if the difference between the time points is greater than the reference difference.

The display control unit may display the second display image on the first display image during the video recording or reproduction.

The second display image generation unit may generate the second display image by gradually reducing the still image.

The display control unit may display a plurality of overlapping second display images.

The plurality of overlapping second display images may be continuously photographed.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, embodiments will be described in detail with reference to the attached drawings. In the following embodiments, a digital camera is described as an example of a digital image capturing apparatus. However, the digital image capturing apparatus is not limited thereto and may be another digital device such as a digital camcorder, a personal digital assistant (PDA), or a smart phone.

Figure 1:
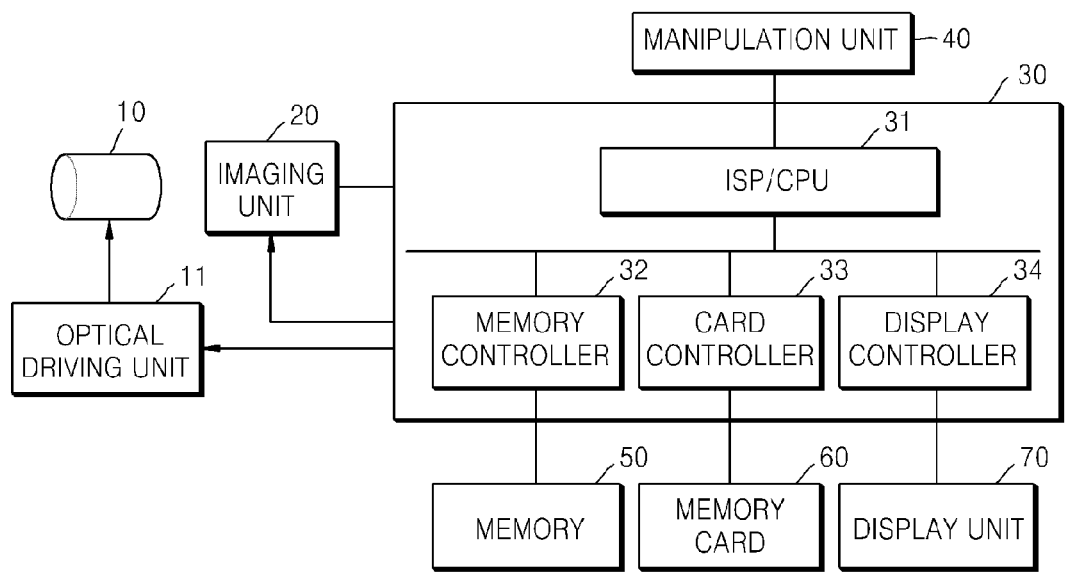
FIG. 1 is a block diagram of a digital camera as an example of a digital image capturing apparatus, according to an embodiment.

FIG. 1 is a block diagram of a digital camera as an example of a digital image capturing apparatus, according to an embodiment.

Referring to FIG. 1, the digital camera includes an optical unit 10, an optical driving unit 11 for driving the optical unit 10, an imaging unit 20, a camera control unit 30, a manipulation unit 40, a memory 50, a memory card 60, and a display unit 70.

The optical unit 10 includes an imaging optical system for obtaining an optical signal from a subject, a shutter, and an iris. The imaging lens system includes a focus lens for adjusting a focus, and a zoom lens for adjusting a focal length.

The optical driving unit 11 may include a focus lens driving unit for adjusting a position of the focus lens, an iris driving unit for adjusting an aperture of the iris, and a shutter driving unit for opening or closing the shutter.

The imaging unit 20 includes an imaging device for generating an image signal by imaging light that passes through an imaging optical system of an interchangeable lens. The imaging device may include a plurality of photoelectric conversion units aligned in a matrix, and vertical or/and horizontal transmission lines for obtaining an image signal by moving charges from the photoelectric conversion unit in synchronization with a timing signal. The imaging device may be, for example, a charge-coupled device (CCD) sensor or a complementary metal-oxide semiconductor (CMOS) sensor. If a CCD sensor is used, the imaging unit 20 may further include a correlated double sampler (CDS)/amplifier (AMP) for removing low-frequency noise included in an electrical signal output from the imaging device and amplifying the electrical signal to a certain level, and an analog-to-digital (A/D) converter for converting the electrical signal output from the CDS/AMP into a digital signal.

Also, the digital camera includes the camera control unit 30. The camera control unit 30 includes an image signal processor (ISP)/central processing unit (CPU) 31.

The ISP/CPU 31 may calculate auto white balance (AWB), auto exposure (AE), and auto focus (AF) evaluation values of the image signal generated by the imaging unit 20, and may appropriately control a white balance, an exposure, and a focus of the image signal according to the calculated evaluation values. Also, various application operations, e.g., object recognition such as face recognition, and scene recognition, may be performed on the image signal. Furthermore, image processing for recording, storing, and displaying may be performed on the image signal. Examples of the image processing include gamma correction, color filter array interpolation, color matrix, color correction, and color enhancement. Besides, for recording and storing, the image signal may be compressed in a Joint Photographic Experts Group (JPEG) or Lempel-Ziv-Welch (LZW) format.

The camera control unit 30 further includes a memory controller 32, a card controller 33, and a display controller 34.

The memory controller 32 may temporarily store or output captured images and various types of information in or from the memory 50. Also, the memory controller 32 may read programs stored in the memory 50. The memory 50 may include, for example, dynamic random-access memory (DRAM) or synchronous DRAM (SDRAM) as a buffer memory for temporarily storing the captured images and the various types of information, and may include, for example, flash memory or read-only memory (ROM) as a storage for storing the programs.

The card controller 33 may store and read image files in or from the memory card 60. In addition to the image files, the card controller 33 may control reading and storing of various types of desired information. The memory card 60 may be, for example, a secure digital (SD) card. Although the memory card 60 is used as a recording medium, the current embodiment is not limited thereto and image files and various types of information may be stored by using, for example, an optical disk (e.g., a compact disk (CD), a digital versatile disk (DVD), or a blu-ray disk (BD)), a magnetooptical disk, or a magnetic disk. If a recording medium such as an optical disk (e.g., a CD, a DVD, or a BD), a magnetooptical disk, or a magnetic disk is used, a reading device for reading the recording medium may be additionally used.

The display controller 34 may control the display unit 70 to display an image. The display unit 70 may be, for example, a liquid crystal display (LCD) or an organic light emitting diode (OLED).

Also, the digital camera includes the manipulation unit 40 for inputting a user manipulation signal. The manipulation unit 40 may be a member used by a user to manipulate the digital camera or to make various setups for image capturing. The manipulation unit 40 may be formed as, for example, buttons, keys, a touch panel, a touch screen, or a dial, and may input user manipulation signals such as power on/off, image capturing start/stop, reproduction start/stop/search, optical system driving, mode change (e.g., execution of a video capturing mode), menu manipulation, and selection manipulation signals. For example, a shutter button may be half-pressed, fully pressed, or released by a user. A manipulation signal for starting focus control may be output when the shutter button is half-pressed (manipulation S1), and the focus control may be terminated when the shutter button is released from the half-pressed state. A manipulation signal for starting image capturing may be output when the shutter button is fully pressed (manipulation S2). The manipulation signal may be transmitted to, for example, the ISP/CPU 31 to drive a corresponding element.

Figure 2:
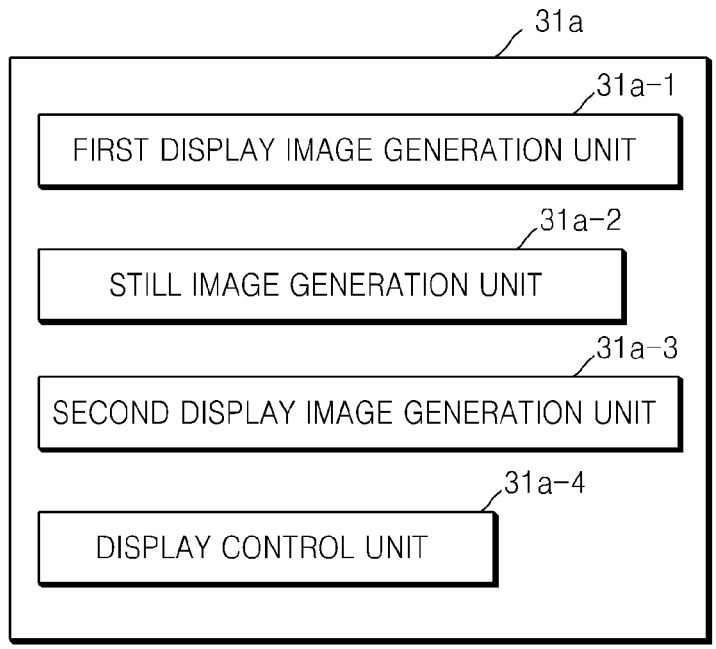
FIG. 2 is a block diagram of an image signal processor (ISP)/central processing unit (CPU) of the digital camera illustrated in FIG. 1, according to an embodiment.

FIG. 2 is a block diagram of an ISP/CPU 31a of the digital camera illustrated in FIG. 1, according to an embodiment.

Referring to FIG. 2, the ISP/CPU 31a includes a first display image generation unit 31a-1 for generating a first display image that indicates a progress of video recording or reproduction, a still image generation unit 31a-2 for generating a still image by selecting at least one of a plurality of frame images for forming a video, a second display image generation unit 31a-3 for generating a second display image corresponding to the still image, and a display control unit 31a-4 for displaying the second display image on the first display image in correspondence with a time point when the still image is generated.

The still image generation unit 31a-2 may generate the still image by using at least one of the plurality of frame images, which is selected by a user. For example, if the user presses a shutter release button during the video recording or reproduction, a current displayed live-view image or reproduction image may be captured as a still image.

A plurality of still images may be generated during the video recording or reproduction. For example, if the user presses the shutter release button a plurality of times during the video recording or reproduction, a plurality of still images may be generated. In this case, a plurality of second display images corresponding to the plurality of still images may be generated. Each of the second display images is obtained by reducing the size of a corresponding still image, and may be a thumbnail image. If a plurality of still images are generated, a plurality of second display images may be generated.

The display control unit 31a-4 may display each of the second display images on the first display image in correspondence with a time point when a corresponding still image is generated. In more detail, if a first still image is generated at a first time point, a second still image is generated at a second time point, and then a third still image is generated at a third time point during the video recording or reproduction, a second-first display image corresponding to the first still image may be displayed in correspondence with the first time point, a second-second display image corresponding to the second still image may be displayed in correspondence with the second time point, and a second-third display image corresponding to the third still image may be displayed in correspondence with the third time point on the first display image. A ratio of a first interval between the first and second time points, and a second interval between the second and third time points may correspond to a ratio of a first interval between the second-first and second-second display images, and a second interval between the second-second and second-third display images displayed on the first display image. That is, the display control unit 31a-4 may display on the first display image the second display images corresponding to the still images at intervals proportional to differences between time points when the still images are generated.

Figure 3:
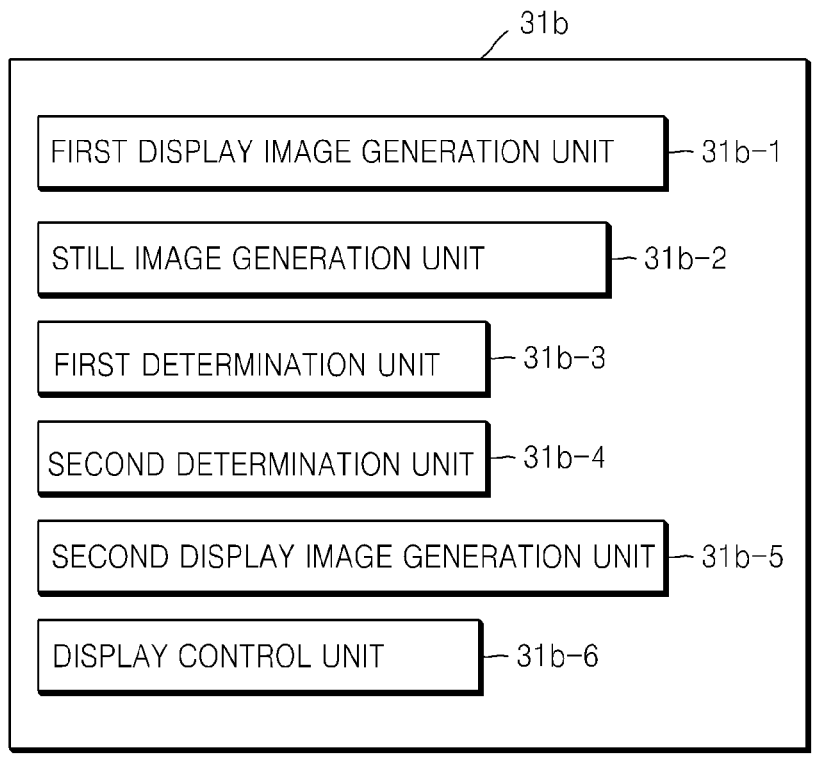
FIG. 3 is a block diagram of an ISP/CPU of the digital camera illustrated in FIG. 1, according to another embodiment.

FIG. 3 is a block diagram of an ISP/CPU 31b of the digital camera illustrated in FIG. 1, according to another embodiment. The ISP/CPU 31b is similar to the ISP/CPU 31a illustrated in FIG. 2 and thus differences therebetween will be mainly described here.

Referring to FIG. 3, the ISP/CPU 31b includes a first display image generation unit 31b-1 for generating a first display image that indicates a recording or reproduction progress of a video, a still image generation unit 31b-2 for generating still images by selecting some of a plurality of frame images for forming the video, a first determination unit 31b-3 for comparing the number of still images to a reference number, a second determination unit 31b-4 for comparing a difference between a time point when a first still image is generated and a time point when a second still image previous to the first still image is generated, to a reference difference if the number of still images is greater than the reference number, a second display image generation unit 31b-5, and a display control unit 31b-6.

The second display image generation unit 31b-5 may not generate second display images corresponding to the still images if the difference between the time points is equal to or less than the reference difference, and may generate the second display images corresponding to the still images if the difference between the time points is greater than the reference difference. The display control unit 31b-6 may display the generated second display images on the first display image.

Alternatively, the second display image generation unit 31b-5 may generate the second display images corresponding to the still images regardless of the difference between the time points. In this case, the display control unit 31b-6 may not display on the first display image a second display image corresponding to the second still image if the difference between the time points is less than the reference difference, and may display on the first display image the second display image corresponding to the second still image if the difference between the time points is greater than the reference difference.

FIGS. 4 through 13 are images of a screen for displaying first and second display images on a digital image capturing apparatus, according to an embodiment. Although the first and second display images are displayed during video recording in FIGS. 4 through 13, the current embodiment is not limited thereto and the first and second display images may also be displayed during video reproduction.

Figure 4:
FIGS. 4 through 13 are images of a screen for displaying first and second display images on a digital image capturing apparatus, according to an embodiment.

FIG. 4 shows a recording standby state of the screen.

Figure 5:
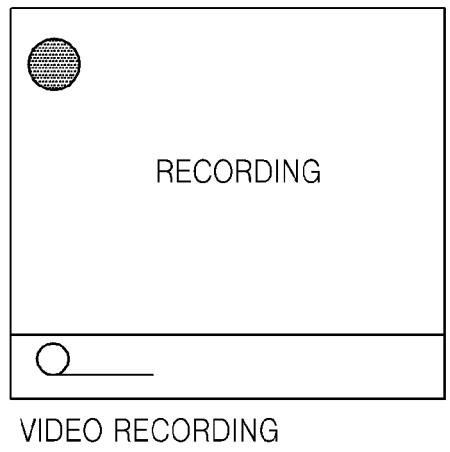

Referring to FIG. 5, when video recording is started, a circular display image indicating that a video is being recorded is displayed on a top-left portion of the screen, and a recording progress bar is displayed as a first display image on a bottom portion of the screen. The recording progress bar indicates a recording progress, and proceeds from left to right according to the recording progress.

Figure 6:
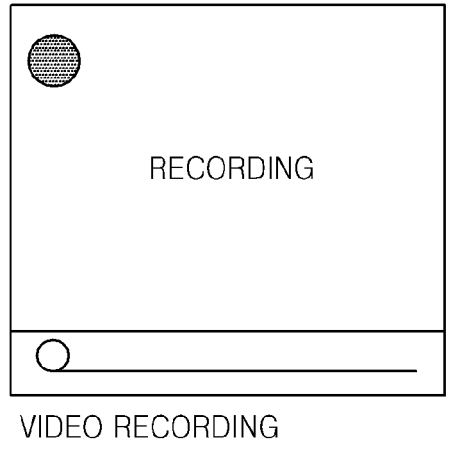

FIG. 6 shows that the recording progress bar reaches an end of the screen.

Figure 7:
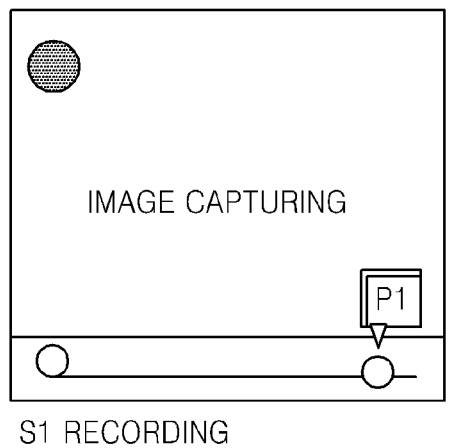

FIG. 7 shows that a first still image is generated by capturing a recording image according to a user manipulation signal during the video recording. In the current embodiment, a second display image P1 corresponding to the generated first still image is displayed on the recording progress bar corresponding to the first display image. In this case, the second display image P1 may be displayed in correspondence with a time point when the first still image is generated, on the recording progress bar that indicates the flow of time. Also, the second display image P1 may be a plurality of overlapping images. Here, the plurality of overlapping images may be continuously photographed.

In FIG. 7, immediately after the first still image is captured, the second display image P1 is displayed at an end portion of the recording progress bar.

Figure 8:
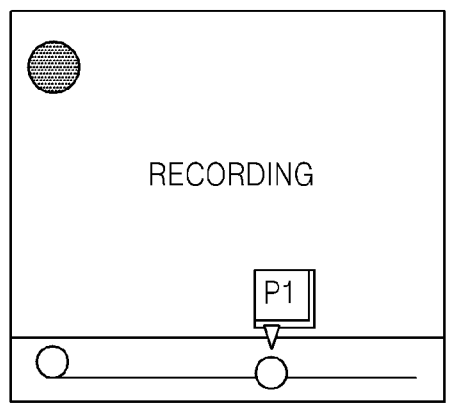

Referring to FIG. 8, if the video recording is continued after the first still image is generated, the second display image P1 moves away from the end of the recording progress bar. This is because, if the end of the recording progress bar is a current time point of the video recording, as time passes, the time point when the first still image is generated moves away from the current time point of the video recording.

Figure 9:
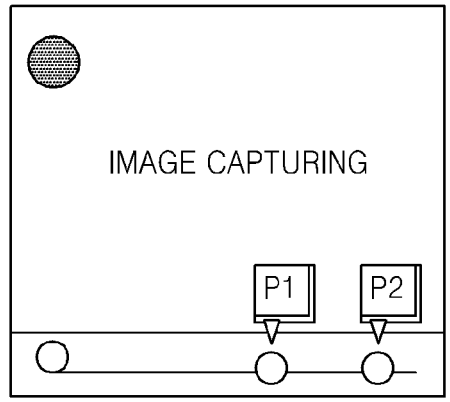

Referring to FIG. 9, if a second still image is generated according to a user manipulation signal while the video recording is continued, a second display image P2 corresponding to the second still image is generated. Then, the second display image P2 is displayed on the recording progress bar in correspondence with a time point when the second still image is generated. An interval between the two second display images P1 and P2 may correspond to an interval between the time points when the first and second still images are generated. If the video recording is continued after the recording progress bar reaches the end of the screen, the two second display images P1 and P2 move toward a recording start point, and the interval between the two second display images P1 and P2 decreases. This is because the recording progress bar has to indicate a longer period of time if the video recording is continued.

Figure 10:
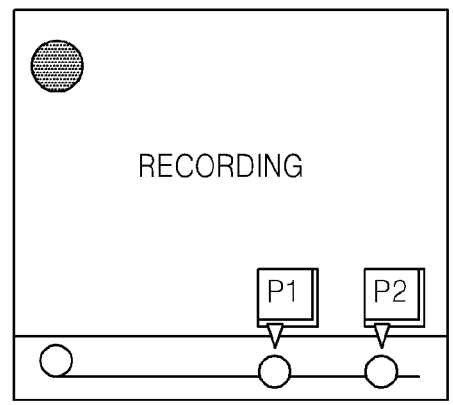

FIG. 10 shows that the video recording is further continued after the second still image is generated. In more detail, the video recording is further continued after the two second display images P1 and P2 are displayed on the recording progress bar.

Figure 11:
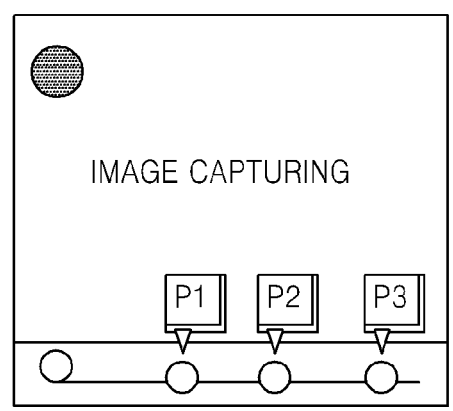

FIG. 11 shows that a third still image is generated, a second display image P3 corresponding to the third still image is generated, and three second display images P1, P2, and P3 are displayed on the recording progress bar, during the video recording.

Figure 12:
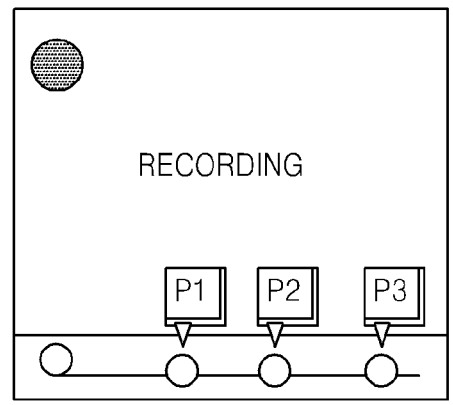

FIG. 12 shows that the video recording is continued after the third still image is generated.

Figure 13:
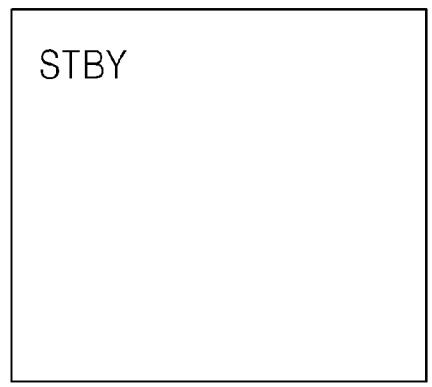

FIG. 13 shows that the video recording is terminated.

Figure 14:
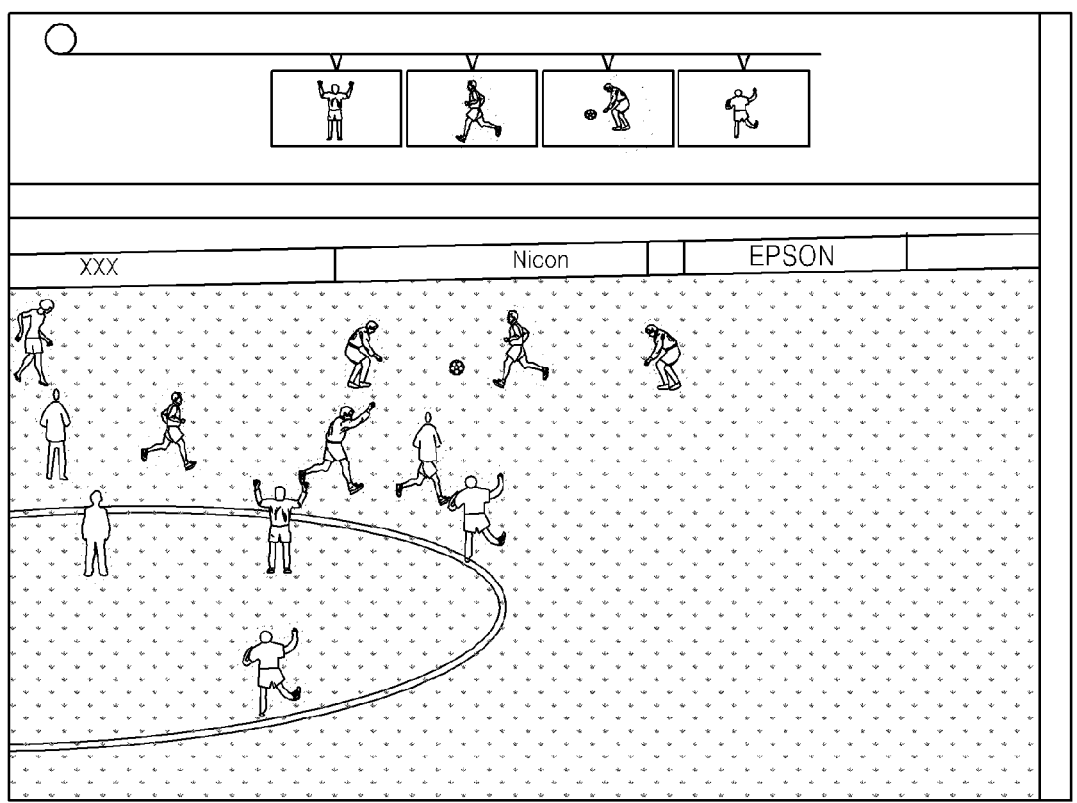
FIG. 14 is an image of a screen for displaying first and second display images on a digital image capturing apparatus, according to another embodiment.

FIG. 14 is an image of a screen for displaying first and second display images on a digital image capturing apparatus, according to another embodiment. In FIG. 14, a recording progress bar is disposed on a top portion of the screen, second display images corresponding to still images are displayed on the recording progress bar in correspondence with time points when the still images are generated.

FIGS. 15 through 22 are images of a screen for displaying second display images corresponding to still images on a digital image capturing apparatus, according to an embodiment.

Figure 15:
FIGS. 15 through 22 are images of a screen for displaying second display images corresponding to still images on a digital image capturing apparatus, according to an embodiment.
Figure 16:
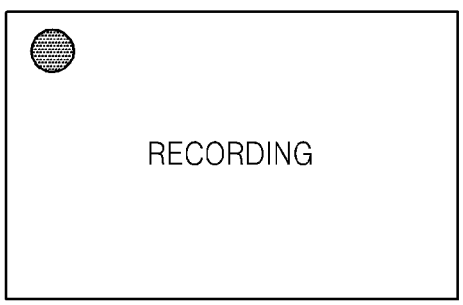
Figure 17:
Figure 18:
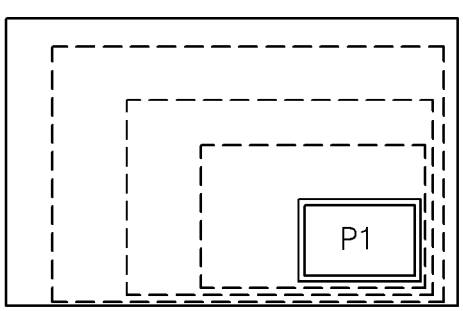
Figure 19:
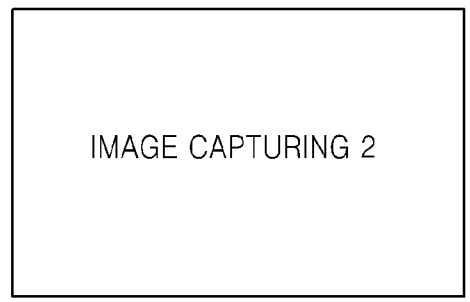
Figure 20:
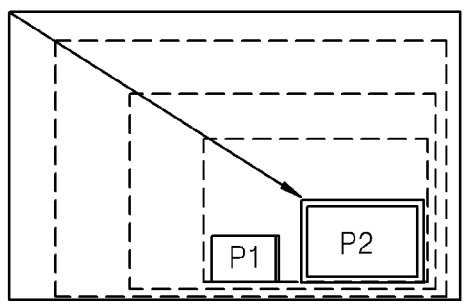
Figure 21:
Figure 22:
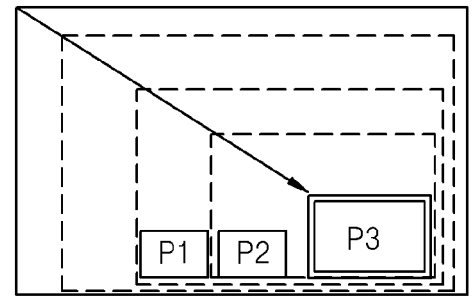

In a video recording standby state STBY as illustrated in FIG. 15, if a video start button is pressed, video recording is started as illustrated in FIG. 16. If a still image capturing button is pressed during the video recording, a first still image of a currently input frame image is captured. A second display image P1 corresponding to the first still image may be generated by gradually reducing the frame image as illustrated in FIG. 18. FIG. 19 shows that a second still image is generated while the video recording is continued, and FIG. 20 shows that a second display image P2 is generated by gradually reducing a frame image corresponding to the second still image. FIG. 21 shows that a third still image is generated while the video recording is further continued, and FIG. 22 shows that a second display image P3 is generated by gradually reducing a frame image corresponding to the third still image.

Figure 23:
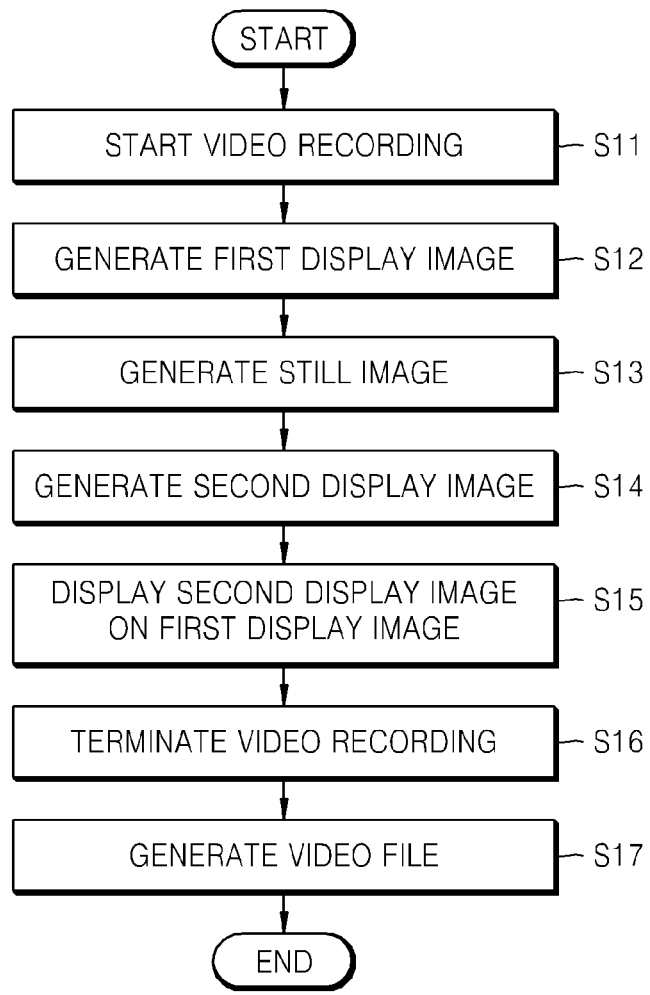
FIG. 23 is a flowchart of a method of controlling a digital image capturing apparatus, according to an embodiment.

FIG. 23 is a flowchart of a method of controlling a digital image capturing apparatus, according to an embodiment. Although the method is applied to video recording in FIG. 23, the current embodiment is not limited thereto and the method may also be applied to video reproduction.

Referring to FIG. 23, initially, video recording is started (operation S11). A first display image for indicating a progress of the video recording is generated (operation S12). For example, the first display image may be a recording progress bar.

A still image is generated by capturing a frame image for forming a video during the video recording (operation S13). A second display image corresponding to the captured still image is generated (operation S14). The second display image is formed by reducing a resolution of the still image, and may have, for example, a resolution of a thumbnail image. However, the second display image is not limited thereto.

Then, the second display image may be displayed on the first display image (S15). The second display image may be displayed as a thumbnail image on the recording progress bar. In this case, the second display image may be displayed on the first display image in correspondence with a time point when the still image is captured.

The video recording is terminated (operation S16), and a video file is generated (operation S17).

Figure 24:
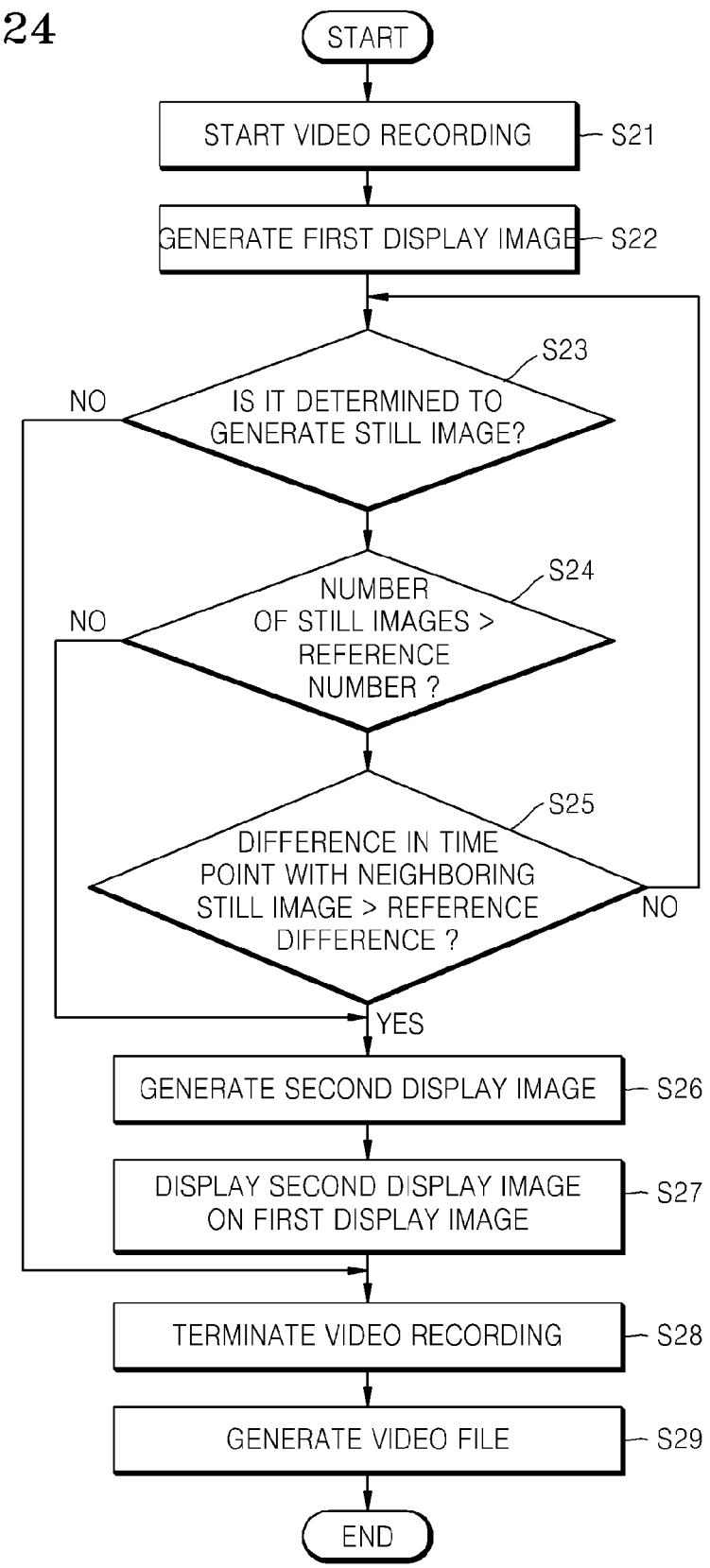
FIG. 24 is a flowchart of a method of controlling a digital image capturing apparatus, according to another embodiment.

FIG. 24 is a flowchart of a method of controlling a digital image capturing apparatus, according to another embodiment. Although the method is applied to video recording in FIG. 24 as in FIG. 23, the current embodiment is not limited thereto and the method may also be applied to video reproduction.

Referring to FIG. 24, initially, video recording is started (operation S21).

A first display image for indicating a progress of the video recording is generated (operation S22). For example, the first display image may be a recording progress bar.

It is determined whether to generate a still image (operation S23). If the still image is generated according to a user manipulation signal, it may be determined whether the user manipulation signal is input.

If it is determined to generate a still image, it is determined whether the number of generated still images is greater than a reference number (operation S24).

If the number of still images is greater than the reference number, it is determined whether a difference in time point with a neighboring still image is greater than a reference difference (operation S25).

If the difference in time point is greater than the reference difference, a second display image corresponding to the generated still image is generated (operation S26). Then, the second display image is displayed on the first display image (operation S27).

If it is determined not to generate a still image in operation S23, a second display image is not displayed. The video recording is terminated according to a user manipulation signal (operation S28).

If the number of still images is not greater than the reference number in operation S24, a second display image corresponding to the generated still image is generated (operation S26).

If the difference in time point is not greater than the reference difference in operation S25, it is determined whether to generate a still image (operation S23).

A user presses a video recording stop button to terminate the video recording (operation S28), and a video file is generated (operation S29). The button is an example and the video recording may be terminated automatically or by using one of various manipulation members.

According to the embodiments, if a second display image corresponding to a captured still image is displayed on a first display image that indicates a progress of video recording or reproduction, a time point when the still image is captured may be indicated. As such, a user may easily check a video recording or reproduction history.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling a digital image capturing apparatus, the method comprising:
    displaying a video selected from a group having a live video and a pre-recorded video, the video comprising a plurality of frame images;
    generating a first display image that indicates a progress of the video, wherein the first display image is different from the video;
    while displaying the video, generating a still image by selecting at least one frame image of the plurality of frame images of the video, and generating a second display image corresponding to the still image; and
    displaying the second display image on the first display image in correspondence with a time point when the still image is captured and generated during displaying the video.

2. The method of claim 1, wherein the generating of the still image comprises generating the still image by using at least one of the plurality of frame images, which is selected by a user.

3. The method of claim 1, wherein the generating of the still image comprises generating a plurality of still images by selecting some of the plurality of frame images, and
    wherein the displaying of the second display image on the first display image comprises displaying on the first display image second display images corresponding to the still images in correspondence with time points when the still images are generated.

4. The method of claim 3, wherein the displaying of the second display images on the first display image comprises displaying on the first display image the second display images corresponding to the still images at intervals proportional to differences between the time points when the still images are generated.

5. The method of claim 3, further comprising:
comparing the number of still images to a reference number;
comparing a difference between a time point when a first still image is generated and a time point when a second still image previous to the first still image is generated, to a reference difference if the number of still images is greater than the reference number;
not displaying on the first display image a second display image corresponding to the second still image if the difference between the time points is equal to or less than the reference difference; and
displaying on the first display image the second display image corresponding to the second still image if the difference between the time points is greater than the reference difference.

6. The method of claim 1, wherein the displaying of the second display image on the first display image comprises displaying the second display image on the first display image during the video.

7. The method of claim 1, wherein the generating the second display image comprises generating the second display image by gradually reducing the still image.

8. The method of claim 1, wherein the displaying of the second display image on the first display image comprises displaying a plurality of overlapping second display images.

9. The method of claim 8, wherein the plurality of overlapping second display images are continuously photographed.

10. A digital image capturing apparatus comprising:
a display unit that displays a video, wherein the video comprises a plurality of frame images;
a first display image generation unit that generates a first display image that indicates a progress of the video, wherein the first display image is different from the video;
a still image generation unit that generates a still image by selecting at least one frame image of the plurality of frame images of the video, while the display unit displays the video;
a second display image generation unit that generates a second display image corresponding to the still image; and
a display control unit that displays the second display image on the first display image in correspondence with a time point when the still image is captured and generated during displaying the video.

11. The digital image capturing apparatus of claim 10, wherein the still image generation unit generates the still image by using at least one of the plurality of frame images, which is selected by a user.

12. The digital image capturing apparatus of claim 10, wherein the still image generation unit generates a plurality of still images by selecting some of the plurality of frame images, and
wherein the display control unit displays on the first display image second display images corresponding to the still images in correspondence with time points when the still images are generated.

13. The digital image capturing apparatus of claim 12, wherein the display control unit displays on the first display image the second display images corresponding to the still images at intervals proportional to differences between the time points when the still images are generated.

14. The digital image capturing apparatus of claim 12, further comprising:
a first determination unit that compares the number of still images to a reference number; and
a second determination unit that compares a difference between a time point when a first still image is generated and a time point when a second still image previous to the first still image is generated, to a reference difference if the number of still images is greater than the reference number, and
wherein the display control unit does not display on the first display image a second display image corresponding to the second still image if the difference between the time points is less than the reference difference, and displays on the first display image the second display image corresponding to the second still image if the difference between the time points is greater than the reference difference.

15. The digital image capturing apparatus of claim 10, wherein the display control unit displays the second display image on the first display image during the video.

16. The digital image capturing apparatus of claim 10, wherein the second display image generation unit generates the second display image by gradually reducing the still image.

17. The digital image capturing apparatus of claim 10, wherein the display control unit displays a plurality of overlapping second display images.

18. The digital image capturing apparatus of claim 17, wherein the plurality of overlapping second display images are continuously photographed.

19. A non-transitory computer program product, comprising a computer usable medium having a computer readable program code embodied therein, said computer readable program code adapted to be executed to implement a method, said method comprising:
displaying a video selected from a group having a live video and a pre-recorded video, the video comprising a plurality of frame images;
generating a first display image that indicates a progress of the video, wherein the first display image is different from the video;
while displaying the video, generating a still image by selecting at least one frame image of the plurality of frame images of the video, and generating a second display image corresponding to the still image; and
displaying the second display image on the first display image in correspondence with a time point when the still image is captured and generated during displaying the video.

20. The method of claim 1, further comprising:
while displaying the video and the second display image on the first display image, generating a second still image by selecting at least one frame image of the plurality of frame images of the video, and generating a third display image corresponding to the second still image; and
displaying the third display image on the first display image in correspondence with a time point when the second still image is generated while moving the second display image.

* * * * *